Figure 1:
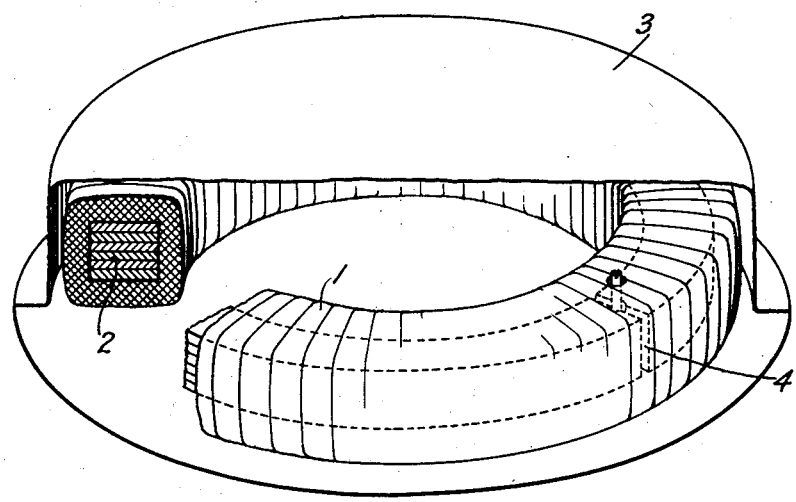

April 19, 1932.  H. A. BURGESS  1,854,824

TOROIDAL COIL

Filed Feb. 26, 1929

INVENTOR
H. A. BURGESS
BY
ATTORNEY

Patented Apr. 19, 1932

1,854,824

UNITED STATES PATENT OFFICE

HARRY A. BURGESS, OF CHATHAM, NEW JERSEY, ASSIGNOR TO BELL TELEPHONE LABORATORIES, INCORPORATED, OF NEW YORK, N. Y., A CORPORATION OF NEW YORK

TOROIDAL COIL

Application filed February 26, 1929. Serial No. 342,733.

This invention relates to adjustable inductances and more particularly to variable toroidal coils.

The advantages of a toroidal coil, such as small external field, adaptability to the use of magnetic material etc. are well known. However, in the past it has been impractical to use toroidal coils in situations where a variable inductance is required or a fixed inductance of accurate value. The reason for this is that the only method known in the past for changing the inductance of such a coil has been, so far as applicant is aware, changing the actual number of turns in the windings. This is at best a cumbersome and very inexact method, and cannot be used where the inductance value must be changed after the coil has been installed in such a position that turns of the winding cannot be put on or taken off. This difficulty has been obviated in some cases by inserting, at some convenient place in series with one or both leads to the coil, a small additional coil and making the winding adjustments on this auxiliary coil. This amounts to the same thing,— namely, changing the effective number of turns in the winding, but represents a more expeditious way of doing it.

While the above method has sufficed for certain purposes, it is useless in many cases where very accurate inductance values are required. The lack of some practical method of varying the inductance of a toroidal coil through the range of values between the outside permissible limits in both directions, either continuously or by sufficiently small steps to obtain a highly accurate setting anywhere in this range, has precluded the use of this type of coil in many situations, such as in wave filters of high accuracy.

Some idea of the accuracy required by coils of this type when used in wave filters may be realized when the effect upon the inductance of a coil of simply potting it or impregnating it with a preservative material is taken into consideration. The other elements of the filter environment also have an appreciable effect upon the inductance of a coil, said effect being difficult to determine and practically impossible to allow for during manufacture. On this account the most satisfactory results may be obtained by completely assembling and testing the filters under conditions simulating those of the field and providing coils which may be adjusted to the necessary value as determined by the proper tests.

An object of the invention is to improve the construction of adjustable toroidal inductances so as to permit facility in making adjustments.

A further object of the invention is to facilitate the adjustment of such coils after they have been permanently encased.

A feature of the invention resides in placing a short-circuited auxiliary coil, or a coil in series with the main winding, in the field of a toroidal coil and providing means for rotating the auxiliary coil in order to vary its coupling with the main coil so that a precise adjustment of inductance may be obtained.

Figure 2:
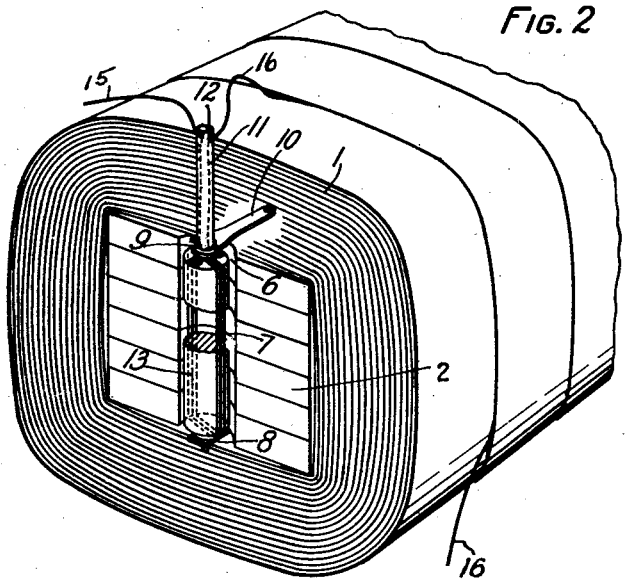

A better understanding of the invention may be had from the following description together with the accompanying drawings in which Fig. 1 shows a partly sectional view of an encased toroidal coil and Fig. 2 an enlarged sectional view of the adjusting means.

In Fig. 1 a toroidal coil 1 is shown wound upon a core 2 and placed in a suitable housing or case 3. The magnetic path of the core is interrupted by a gap or slot 4 to accommodate the inductance adjusting means. One face of the gap is shown in Fig. 2 to illustrate the adjusting means and the manner of assembly in greater detail. As shown, a semi-cylindrical section 6 is cut from each face of the slot thus making a cylindrical hole through the core and providing space within which the adjusting means is mounted. The adjusting means comprises an auxiliary coil 7 of a few turns, said coil being rotatably mounted on suitable bearings, one of which is shown at 9. In the embodiment shown a pair of brackets, 8 and 10, are suitably fastened to the core to support the bearings. A shaft 11 rigidly attached to the coil 7 extends outside of the main winding to provide means for rotating the coil. The friction between the bearings 9 and brackets 8 and 10, which are preferably made of spring material, may be made sufficiently great to hold the coil in a fixed position once an adjustment has been made.

The coil 7 may either have its windings short-circuited or connected in series with the main winding. If the latter type of coil is used, the shaft 11 may be made hollow in order to bring out the auxiliary coil leads, as shown, for connection with the main coil winding. The external leads to the inductance in Fig. 2 are shown at 15 and 16.

The shaft 11 extends to a point inside of the coil casing and a slot 12 or similar arrangement permits adjusting the coil by means of a key or screw driver through a hole in the casing provided for that purpose. This arrangement avoids accidental disturbance of the coil adjustment.

The effect obtained by a coil of this type may be enhanced by a cylindrical core piece 13 placed within the coil 7 in order to provide a more even distribution of magnetic flux through the coil.

Although this invention has been described with reference to one embodiment thereof, it is nevertheless capable of broad interpretation without departing from the spirit of the invention and is to be limited, therefore, only by the scope of the appended claims.

What is claimed is:

1. A toroidal coil having a core with one air-gap therein, means for adjusting its inductance comprising a rotatable coil mounted in said air-gap, and means for equalizing the flux distribution through said rotatable coil.

2. The combination with an encased toroidal coil having a core with an air-gap therein, semi-circular portions being cut from the faces of said gap to accommodate a rotor, of means for adjusting the inductance of said coil comprising a rotor mounted in said gap, said rotor comprising an auxiliary coil, and means for adjusting said rotor from a position external of said casing in order to adjust the inductance of said toroidal coil.

3. The combination with an encased toroidal coil having a core with an air-gap therein, semi-circular portions being cut from the faces of said gap to accommodate a rotor, of means for adjusting the inductance of said coil comprising a rotatable auxiliary coil mounted in said gap, means comprising a hollow shaft rigidly attached to said coil to permit rotation thereof, and means for connecting said auxiliary coil in series with said main coil said means comprising leads extending through said hollow shaft.

4. An inductance device comprising solenoidal windings formed into a toroidal coil, means for regulating the inductance of said toroidal coil, said means comprising an auxiliary coil completely inclosed within the solenoid windings of said toroidal coil.

5. An inductance device comprising solenoidal windings formed into a toroidal coil, means for regulating the inductance of said toroidal coil, said means comprising an auxiliary coil completely inclosed within the solenoidal windings of said toroidal coil, and means for evenly distributing the magnetic flux of said auxiliary coil.

6. An inductance device comprising solenoidal windings formed into a toroidal coil, means for regulating the inductance of said toroidal coil, said means comprising an auxiliary coil completely inclosed within the solenoidal windings of said toroidal coil, and means for evenly distributing the magnetic flux of said auxiliary coil, said means comprising a cylindrical core piece located within the windings of said auxiliary coil.

7. An inductance device comprising solenoidal windings formed into a toroidal coil, means for regulating the inductance of said toroidal coil, said means comprising an auxiliary coil completely inclosed within the solenoidal windings of said toroidal coil, and means for connecting said auxiliary coil in series with said toroidal coil.

8. An inductance device comprising solenoidal windings formed into a toroidal coil, means for regulating the inductance of said toroidal coil, said means comprising an auxiliary coil completely inclosed within the solenoidal windings of said toroidal coil, said auxiliary coil being rotatably mounted.

9. An inductance device comprising solenoidal windings formed into a toroidal coil, means for regulating the inductance of said toroidal coil, said means comprising an auxiliary coil completely inclosed within the solenoidal windings of said toroidal coil, said auxiliary coil being rotatably mounted on a hollow shaft, and means for connecting said auxiliary coil in series with said toroidal coil, said means comprising conductors passing through said hollow shaft.

10. An inductance device comprising solenoidal windings formed into a toroidal coil, means for regulating the inductance of said toroidal coil, said means comprising an auxiliary coil completely inclosed within the solenoidal windings of said toroidal coil, and means for externally varying the position of said auxiliary coil.

11. An inductance device comprising solenoidal windings formed into a toroidal coil, means for regulating the inductance of said toroidal coil, said means comprising an auxiliary coil completely inclosed within the solenoidal windings of said toroidal coil, said auxiliary coil being rotatably mounted on a shaft, said shaft passing through said solenoidal windings and extending to a position outside of said toroidal coil, and means applied to the external end of said shaft in order to vary the position of said auxiliary coil.

12. In a combination of a toroidal coil having a toroidal core of magnetic material, means for varying its self-inductance, said means comprising a rotatable auxiliary coil entirely inclosed within the core space of said toroidal coil.

In witness whereof I hereunto subscribe my name this 19th day of February, 1929.

HARRY A. BURGESS.